INVENTOR.
Louis P. Miller
BY Ramsey, Kent, Chisholm + Lutz
his ATTORNEYS

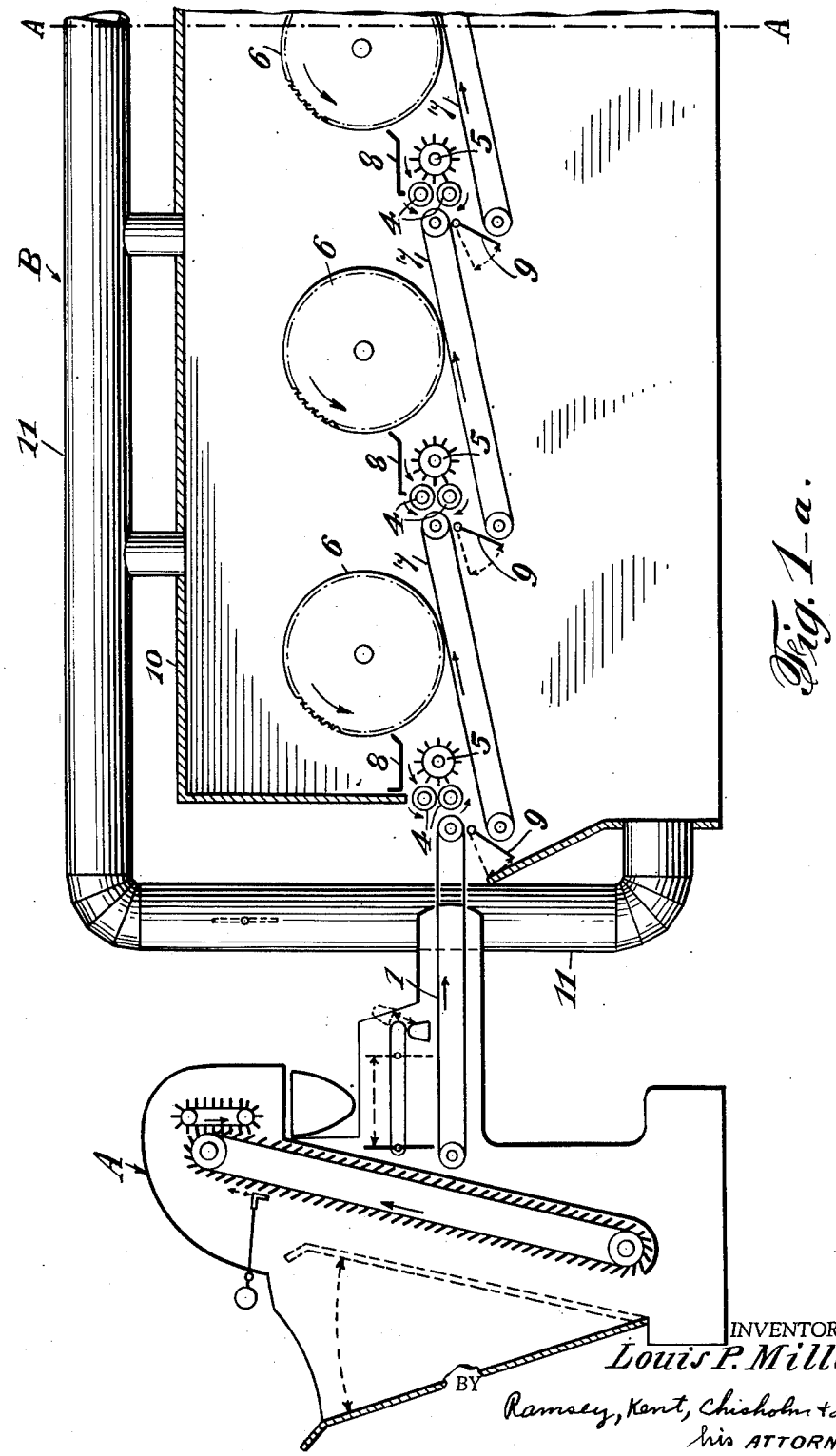
Fig. 1-a.

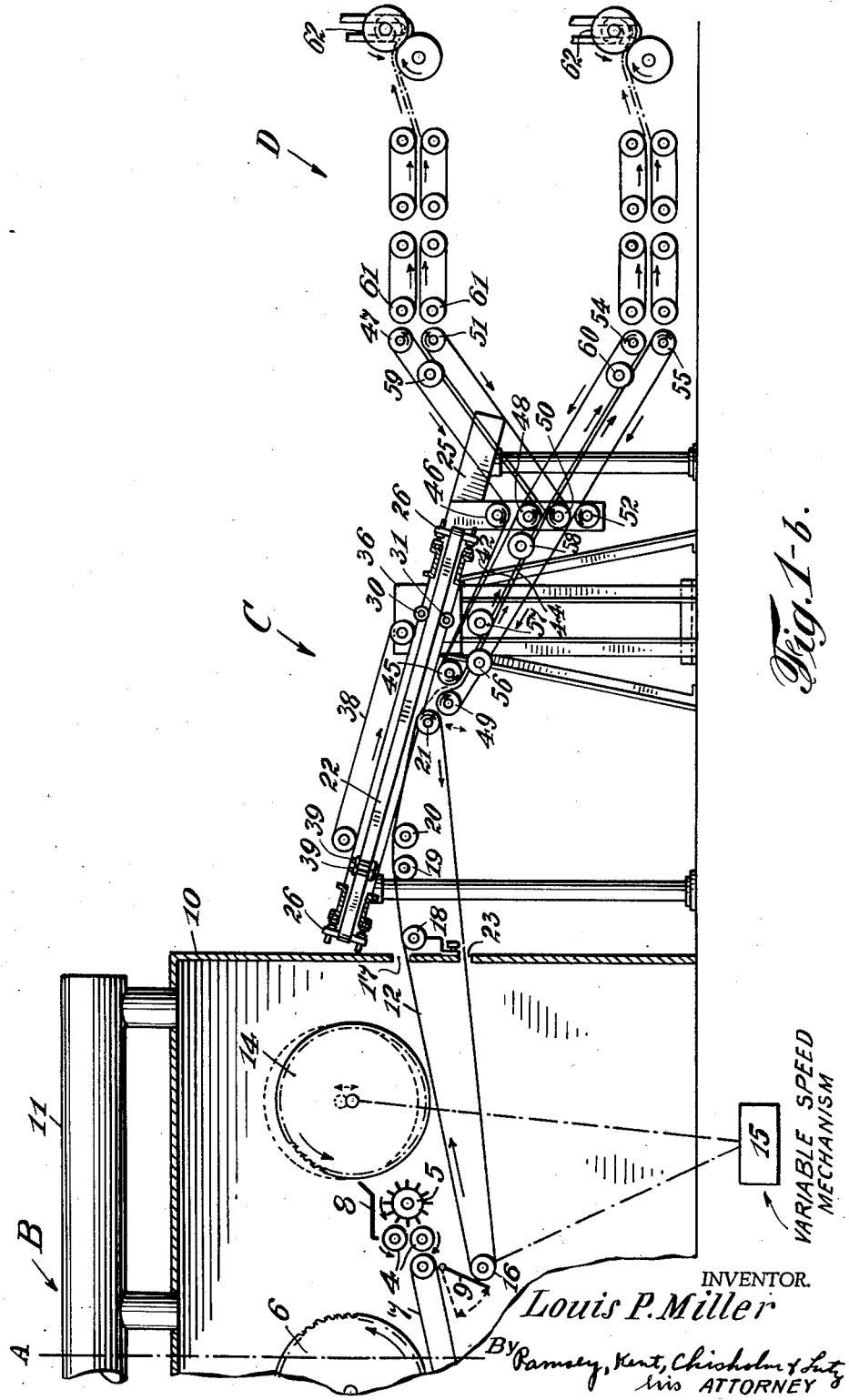

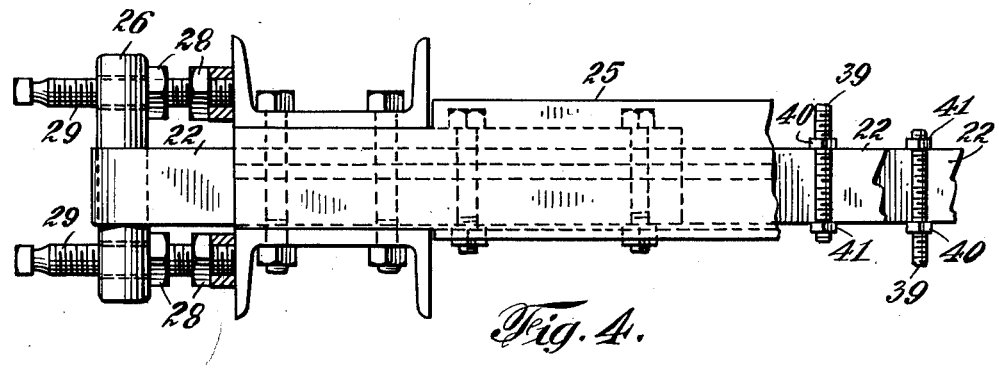
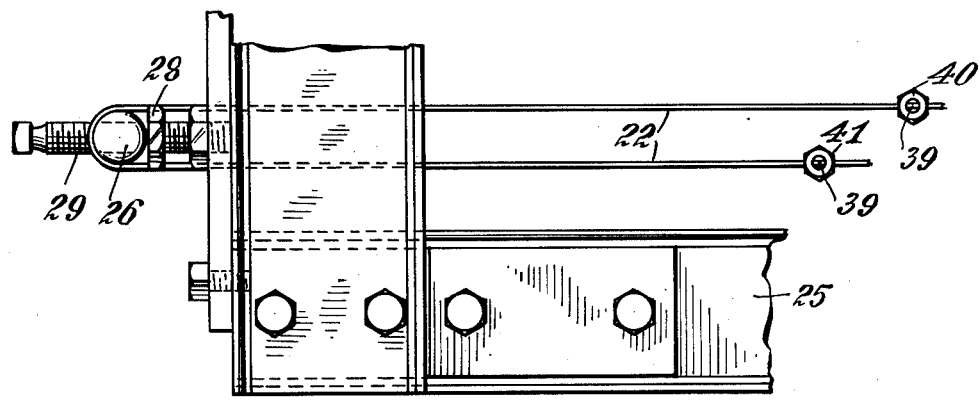
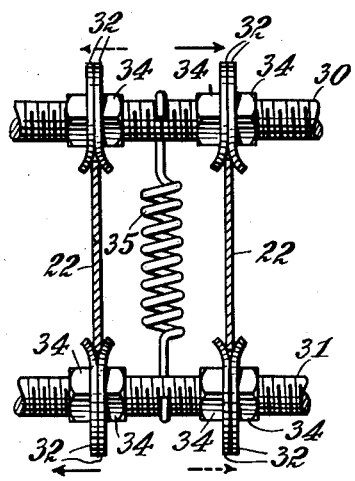
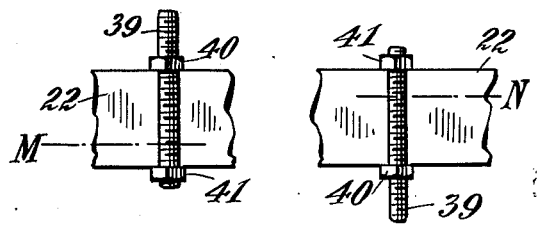

Oct. 24, 1944.  L. P. MILLER  2,361,308
METHOD OF MAKING SLIVERS
Original Filed June 12, 1940  5 Sheets—Sheet 5
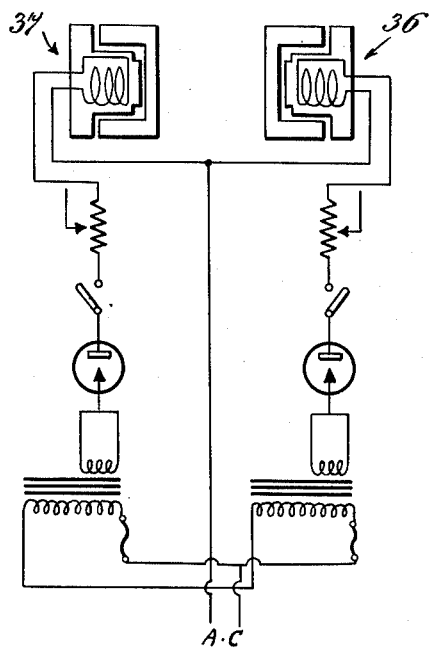
Fig. 9.
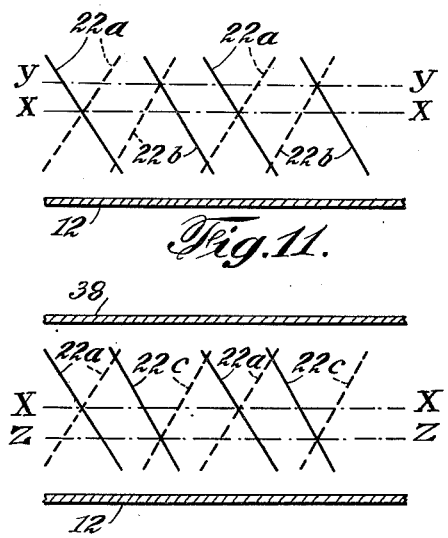
Fig. 11.
Fig. 12.
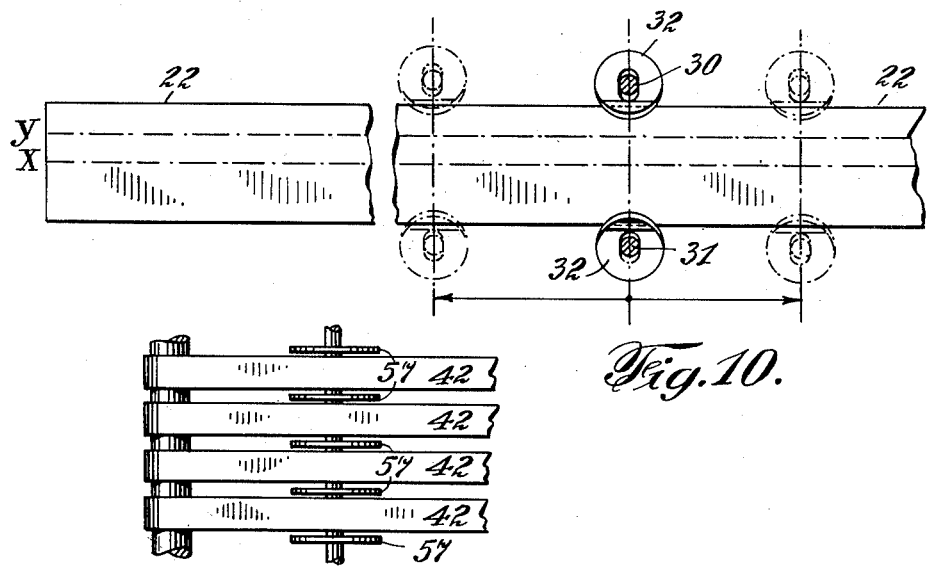
Fig. 10.
Fig. 13.
INVENTOR.
Louis P. Miller
BY Ramsey, Kent, Chisholm & Lutz
his ATTORNEY

UNITED STATES PATENT OFFICE 2,361,308

METHOD OF MAKING SLIVERS

Louis P. Miller, Walden, N. Y., assignor to Miller-Jonas Holding Co., Inc., Walden, N. Y., a corporation of New York Original application June 12, 1940, Serial No. 340,050, now Patent No. 2,274,423, dated February 24, 1942. Divided and this application November 6, 1941, Serial No. 417,972

13 Claims. (Cl. 19—150)

The present invention relates to a method in the art of textiles and more especially relates to that branch of textiles dealing with the production of slivers or rovings.

More especially the present invention relates to methods for producing slivers or rovings from fur or other textile fibers which are of such nature as to be very difficult to handle in machines heretofore available in the art.

The method comprising the present invention may be performed in different ways but preferably is carried out by a mechanism which comprises a plurality of stretched bands of steel set edgewise so as to form a table or bed. These bands may be used to divide a lap or batt into a plurality of separated elongated masses of textile fibers which may be fed by suitable conveyors to a condenser mechanism where the fibers may be treated to cause sufficient coherence to form slivers.

These bands are also capable of being vibrated in such manner as to produce a twisting action to each individual band. The textile material fed to the vibrating bands is picked up by the oscillating movement of the bands and tends to remain in the zone bounded by the edges of adjacent bands so that the fibers between adjacent bands are subjected to the action of the bands themselves plus the action of air currents established by the movements of the bands. Preferably, the band table is inclined to the horizontal and the material is fed to the upper end of the inclined bed or table. This inclination plus the weight of the oncoming material, a conveyor beneath the bands, and vibration of the bands cause the material to move downward lengthwise of the bands. During the movement of the material lengthwise of the bands, it is continually being subjected to the mechanical effects due to vibration and air currents produced by the vibrating bands so as to tend to orient the fibers. This treatment continues until the loose material has moved downward between the bands into a zone of relatively small vibration at which time the material has become sufficiently compacted to tend to drop away from the vibrating bands as slivers or rovings. It is now picked up by suitable conveyor belts which carry the individual slivers to condensing mechanism, well known and common in the art for treating slivers, to condense the same into such form as to enable the sliver to be utilized in other textile operations for which slivers are adapted.

The bands, with very little vibration, will act as lap dividers, but the most effective operation of the present invention depends upon substantial vibration to the bands and in order that this vibration may be satisfactorily produced, it is desirable that the steel bands be provided with suitable tensioning apparatus whereby the bands may be placed under stress best suited for the particular period of vibration that has been chosen. Since sixty cycles per second is a common electrical current, it is convenient to stress the bands to be in harmony with sixty vibrations per second, and then vibrate or oscillate the bands by means of a suitable electrical vibrator energized by a sixty cycle alternating current. A vibrator that is a commercial product and is satisfactory for this purpose is known as the "Syntron" vibrator which, when energized, by a sixty cycle current, produces sixty vibrations per second.

In order to obtain the twisting or oscillating effect on the steel bands, it is desirable to positively drive each edge of each band transversely of its length by separate vibrators, in other words, at a suitable point in the length of the bands, each bottom edge of each band is connected with a vibrator, preferably mounted on one side of the machine, and the top edge of each band is also connected with a suitable drive to a vibrator preferably mounted on the opposite side of the machine or bed. These vibrators are so electrically connected as to cause one to pull its respective band edges in one direction while the other is pulling its respective band edges in the opposite direction.

A construction which functions satisfactorily to carry out the method comprises steel bands made of spring steel and being of a length of substantially eighty-four inches from anchorage to anchorage, one and one-half inches wide and twenty-five thousandths of an inch thick. These bands are spaced substantially one inch apart and are inclined at substantially 15° to the horizontal. The tensioning members for the bands preferably comprise devices whereby a higher tension may be applied to one edge of the band than to the other. Preferably, the bands are tensioned with every other band being substantially uniformly stressed at its top and bottom edge while every intermediate band is stretched with one edge slightly tensioned more than the other. In the bands having their edges tensioned differently, there is a tendency for the higher tensioned edge to have less amplitude of free vibration so that the neutral axis of free vibration is not in the center of such an unevenly tensioned band. By this arrangement of unevenly tensioning the bands, the vibration is so controlled as to position the material between the bands so as to cause the formation of the roving or sliver to be controlled. For example, with alternate bands having highly tensioned upper edges, there is a tendency of the material to be thrown downwardly relatively to the band table and this type of tensioning is desirable where the lap or batt is fed to the top of the band table. Where the lower edges of the alternate bands are tensioned higher, there is a tendency of the vibrating bands to pick up the material from beneath the band table and this type of tensioning is particularly desirable where the lap or batt is under-fed to the band table.

Another factor in carrying out this method is the control of the vibrating bands by varying the mass and the vibrating mass may be changed or controlled by applying weights in suitable positions on the bands. It is to be understood that these weights should preferably be outside of the zone of travel of the textile material between the bands.

Preferably the material is fed to the sliver or roving former from the lap or batt former, such as used in the textile art, which may be in the form of a machine known as a "blower."

It is desirable that the last unit or stage in the lap former or "blower" which controls the feed of material from the former or "blower" shall be of a variable speed control relative to the preceding units of this machine in order that the thickness of the lap fed in a given time from the batt or lap former or "blower" to the sliver maker may be under the control of the operator and in this way, the size of the slivers produced may be controlled or varied as the operator desires.

A more detailed description of the preferred mechanism for carrying out the method comprising the present invention will now be given by reference to the accompanying drawings which illustrate more or less diagrammatically a preferred embodiment of the said invention. Like characters are used to designate like parts throughout the several figures of the drawings.

Fig. 1—a and Fig. 1—b represent a diagrammatic view illustrating in a fabricating line an automatic weighing machine of the "Bramwell" type feeding a lap or batt forming machine which supplies material in suitable form to the sliver or roving machine from which the rovings are conveyed to a condenser from which the finished roving is led to suitable winding apparatus where it is spooled or otherwise packaged for subsequent treatment.

Fig. 4 is a detailed view partly in section illustrating the tensioning devices for a vibrating band.

Fig. 5 is a plan view of one pair of bands illustrated in Fig. 4.

Fig. 6 illustrates the connection between the bands and the vibrator rod.

Fig. 7 illustrates a preferred form of load for the vibrating bands.

Figure 2:
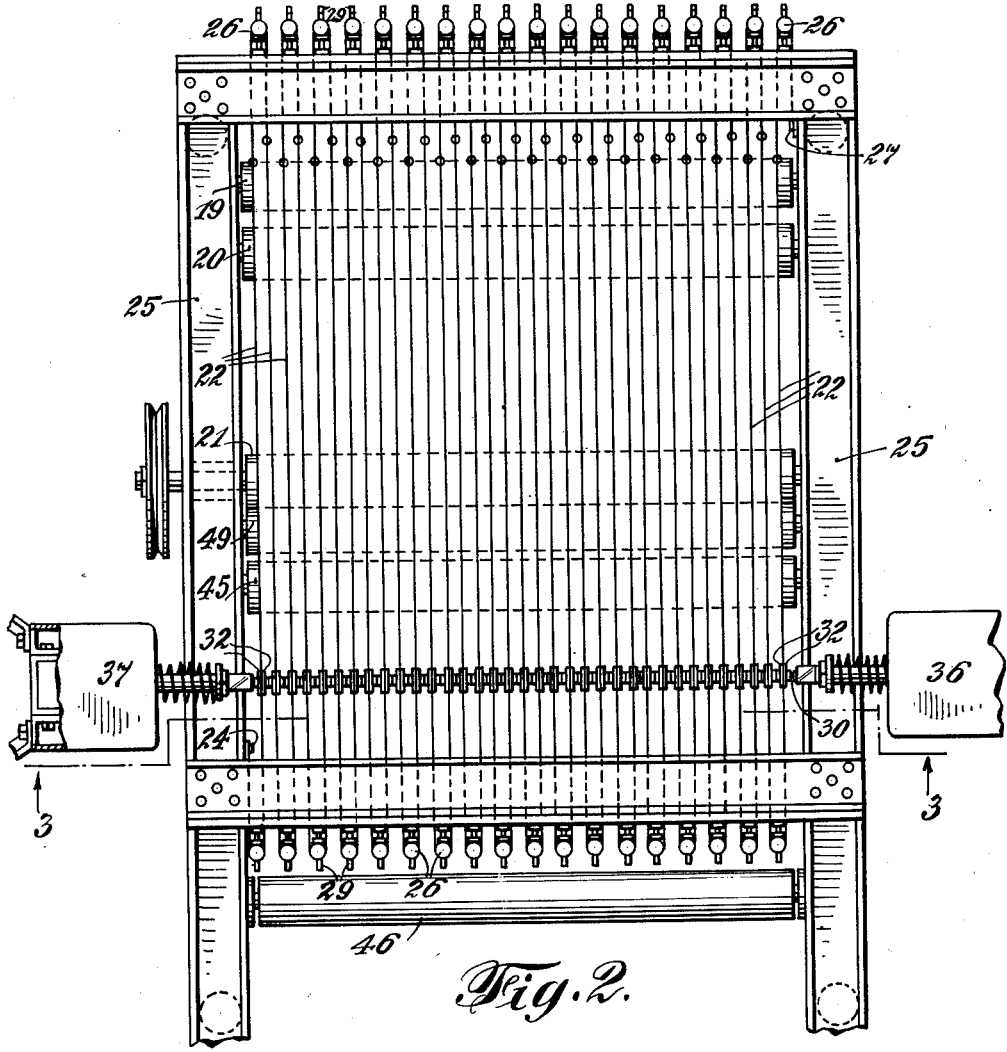
Fig. 2 is a plan view of the sliver or roving maker shown in Fig. 1—b.

Fig. 8 also illustrates a load for the bands.

Fig. 9 illustrates diagrammatically an electrical circuit for connecting "Syntron" vibrators with the device.

Fig. 10 illustrates a band and shows the capability of adjusting the vibrating members lengthwise of the band to position the waves relatively to the length of the bands.

Fig. 11 is a diagrammatic view illustrating the axis of oscillation as being raised on each alternate band due to manner of tuning.

Fig. 12 is a view similar to Fig. 11 showing the axis of oscillation of each alternate band being lowered.

Fig. 13 is a diagrammatic plan detail view of the top roving carrier transfer mechanism between the sliver or roving maker and the condenser.

Referring now to the drawings and more especially to Fig. 1—a, the material, which may be rabbit fur or other suitable material, is dumped into the weighing machine A which predetermines the weight of the material being fed for subsequent operations. This weighing machine A is of a type well known in the art as "Bramwell" and is therefore familiar to those skilled in the art and needs no further description.

The material from the weighing machine A is fed into the lap or batt forming mechanism B, which may be in accordance with the diagrammatic illustration in Figs. 1—a and 1—b. The material from the weighing machine A drops on a conveyor apron 1 which conducts the same to a pair of feed rollers 4. As the material is carried through the feed rollers, it is engaged by a rapidly revolving picker cylinder 5 which disperses the material in an air stream produced by the rapidly revolving cylinder and throws it against a screen or perforated drum 6. A conveyor belt 7 is positioned beneath the screen drum 6 in such manner that the upper run of this belt is practically in contact with the lower portion of the screen drum 6. A baffle plate 8 extends from the upper member of the pair of feed rollers 4 over the rapidly revolving picker cylinder 5 to substantially in contact with the rotating screen drum 6 and an adjustable damper 9 may be provided adjacent the forward end of a conveyor belt 7. The purpose of the baffle plate 8 and the adjustable damper 9 is to control the air currents around and produced by the rapidly revolving picker cylinder 5 in such manner as to cause the air to pass through the adjacent wall of the drum 6 and thus cause the textile or fur material to be thrown by the picker cylinder against the lower portion of the screen drum 6 from which the material is deposited on the upper run of the conveyor belt 7. The screen drum 6 is rotated in such manner that the peripheral speed thereof is substantially the same as the forward travel of the conveyor belt 7. The construction just described is repeated a number of times, for example, four times, within the housing 10 which comprises an enclosed chamber for all the units or stages of said mechanism. Preferably, the upper portion of the housing 10 is connected by ducts 11 (one only being shown) with the lower portion of the housing in such manner as to permit an interchange of air currents from the upper to the lower part of the housing without establishing undesirable eddy currents.

The last stage of the lap forming machine is different from the preceding stages in that a longer conveyor apron 12 receives the fur from the screen drum 14 (which drum may be the same in size and form as the screen drums 6), and delivers the lap to the sliver forming mechanism.

The screen drum 14 and the apron 12 are driven through variable speed mechanism 15, which is also a divergence from the preceding stages of the lap forming mechanism, in order that the speed of movement of the material coming from the last stage of the lap forming machine may be increased or decreased, relative to the speed of movement of the material through the other stages of this machine in order to provide a thick or thin lap according to the wishes of the operator. The space between the portion of the conveyor apron 12 adjacent the periphery of the screen drum 14 and the screen drum 14 is such that the drum applies a very slight pressure to the material comprising the lap that is conveyed forward by the conveyor belt 12. This conveyor apron 12 should preferably be made of material to which the textile material, such as fur, does not adhere. A cloth apron covered or impregnated with rubber composition and coated with a flexible lacquer, all of which is well known in the art, is satisfactory for this use.

This apron 12 passes over a driven roll 16 in an inclined upward direction through an opening 17 in the housing 10 over a supporting roll 18 to a pair of adjustable rolls 19 and 20. The rolls 19 and 20 are adjustable vertically in order to control the angle at which the lap is presented to the roving forming machine C. The apron 12 continues beneath the bed of the roving or sliver forming machine C over a return driven roll 21, and back to the roll 16 through an opening 23 in the housing 10. The rolls 20 and 21 are adjustable beneath the bed of the roving forming machine C in order to control the distance between this bed and the conveyor apron 12, the purpose of which will be explained more specifically in connection with the description of the operation of the roving forming machine.

The roving forming machine C comprises a bed of stretched steel bands 22 set edgewise to the vertical in such manner as to comprise a bed in the form of a grating extending substantially the width of the conveyor belt 12. These steel bands 22 may be of various widths and lengths and may be spaced various distances apart bearing in mind that the length, breadth and thickness of the bands should be considered relatively to the period of vibration selected. The dimensions herein given have been found to operate satisfactorily, but it is to be understood that all of these dimensions may be varied in accordance with the requirements of the results desired. A machine which was operated satisfactorily to carry out the present method comprised a bed of thirty steel bands one and one-half inches wide and twenty-five thousandths of an inch thick. These bands were spaced apart substantially one inch between the bands and were approximately eighty-four inches from center of anchorage to anchorage.

In the construction herewith illustrated, the individual bands comprise loops of one continuous steel band. The end of this band is anchored at 24 to a steel frame 25, preferably made of I-beams of sufficient strength for the purpose intended, and is then looped around cylindrical tension bars 26 (see Figs. 1—b and 4) and continues over a plurality of these bars to the terminal anchorage 27. The terminal anchorage 27 is also provided on the steel frame 25. The anchorages 24 and 27 fix the band in position so that tension thereon may be produced by means of the tension nuts 28 which force the tension bars outwardly on the tension stub bolts 29. While the continuous band is herein shown, it is to be understood individual bands may be satisfactorily used.

Figure 3:
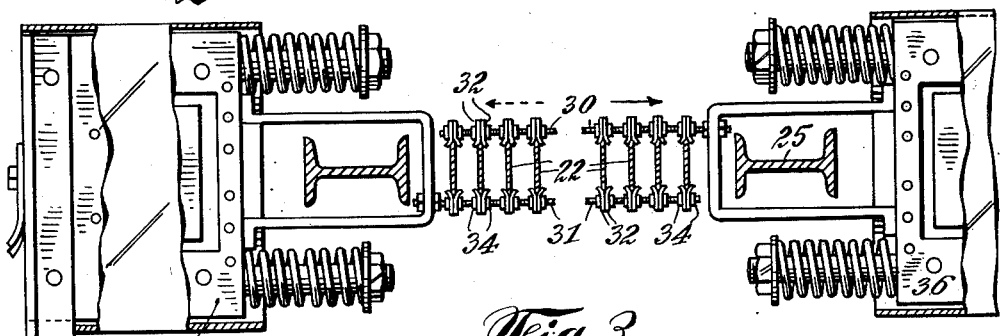
Fig. 3 is a sectional view taken on line 3—3 of Fig. 2.

A pair of vibration rods 30 and 31 (see Figs. 3 and 6) extend crosswise of the bed of the machine above and below the bands 22. These vibration rods are provided with band engaging members 32 which may comprise a pair of washers having an elliptical opening so as to be adjusted crosswise of the vibration rods and to engage the edges of the bands 22 at one point so that the band is free to vibrate on each side of that point. The reason for the crosswise adjustment of the members 32 is to adjust these members to take care of any irregularity of the edges of the bands 22 which may or may not all lie in a common plane. After the members 32 are properly adjusted, both transversely and vertically, they are clamped in position by lock nuts 34 on vibration rods 30 and 31. At suitable intervals, tension springs 35 extend between the vibration rods 30 and 31 to draw these rods together so that the members 32 are held in intimate contact with the edges of the steel bands 22. As is illustrated in Fig. 10, the position of the rods 30 and 31 may be changed as desired.

The vibration rod 30 is connected with a "Syntron" vibrator 36, of the character previously described, at the right side of the machine and the lower vibration rod 31 is connected with another similar "Syntron" vibrator at the left side of the machine. The wiring of the "Syntron" vibrators is such that when the vibrator on the right tends to pull the vibration rod 30 toward the vibrator, the vibrator 37 on the left likewise tends to pull the tension rod 31 toward the vibrator on the left, thus twisting the bands by means of establishing a turning movement around the neutral axis of the bands. Preferably, the electrical circuit connecting the "Syntron" vibrators is in accordance with the diagram in Fig. 9 herewith. Since the symbols of the diagram will be clear to those skilled in the electrical art, further description is believed not to be necessary of this feature of the device.

In order to control the character of the twist according to the present method, it is desirable to tension one edge of certain bands differently from the other edge. Such variable tensioning raises or lowers the axis of oscillation of such a tensioned band, for example, referring to Fig. 11, the bands 22—a are tensioned equally on both edges thereof and the oscillation axis X is located substantially in the middle of the band. In the bands 22—b, the upper portions of these bands are tensioned higher than the lower edges thereof, thus establishing the vibration axis Y as nearer to the upper edge of the band. It is to be understood that the full lines in Fig. 11 indicate the extreme position of the twisting of the bands at one point in the cycle and that the dotted lines indicate the extreme position of the bands when twisted in the opposite direction at another point in the cycle. It is also to be understood that the amount of torsion or twist shown in Fig. 11 is greatly exaggerated, in order to more clearly illustrate the invention. It is to be understood that the amount of oscillation indicated in Fig. 11 is on a cross-section taken substantially midway between the vibrating rods 30 and 31 and the forward end of the machine where the bands have a more individual freedom of movement than is permitted where the vibrating rods 30 and 31 connect with the band.

The condition illustrated by Fig. 11 with the normal axis X below the unevenly tensioned band axis Y is a condition which is particularly desirable where the lap is fed to the bands from the upper edges thereof. In this condition, there is a tendency of the bands to throw down the material of the lap and hold it within the zones of oscillation produced by the differential tension.

Preferably, an apron 38 is mounted above the vibrating bands with the lower run thereof moving in the same direction as the apron 12 beneath the bands. The apron 38 acts more especially as a covering member which, to a substantial extent, retains the vibrated air between the bands and thereby allows the material between the bands to be subjected both by the mechanical impact of the vibrating bands against the material and by the air currents produced between the bands by the vibration thereof.

The character of the oscillation of the bands to carry out the present method, may also be controlled by weights 39 illustrated in Fig. 7. These weights comprise split bolts made from half rounds of brass or other metal (Figs. 7 and 8) and are held in place by nuts 40 and 41 which clamp on each side of the bands 22. The major portion of the weight 40 may be above the band, as illustrated in Fig. 7, or the weights may be so adjusted as to present the major portion of the weight below the band, as in Fig. 8. It is understood that these half rounds are screw threaded throughout their length and by adjusting the nuts 40 and 41 on the screw threads, the center of mass of the weights may be positioned transversely of the bands in any position desired. Where the center of mass of the weights 39 is moved toward one side of the band, the axis of oscillation of the band moves toward the opposite side, while the amplitude of the edge of the band toward which the center of mass has been moved, will be increased. For example, as illustrated in Fig. 7, the axis of oscillation of the band will be moved downwardly as at M while where the weight is largely beneath the band, the axis of oscillation will be moved upwardly as at N. The vibration of the bands may also be substantially varied by setting the weights at different positions relative to the lengths of the bands.

These weights are not excessive in size and in practice quarter inch brass half rounds have been found satisfactory for the purposes desired. Of course, it is to be understood that the effect described is in accordance with the weights disclosed because it might be possible by hanging a long weight on the band to produce undesirable characteristics. These weights as illustrated are approximately three inches in length.

Fig. 12 is a diagrammatic view similar to that shown in Fig. 11 and illustrates the effective oscillation of the bands with the lower edges of alternate bands tensioned to a higher degree than the upper edges thereof whereby the axis Z of these differentially tensioned bands 22—c is moved below the axis X of the evenly tensioned bands 22—a. This type of tensioning, namely, with the lower edges tensioned greater than the upper edges is desirable where the lap is fed to the bottom of the band table and is carried upward between the bands for treatment.

The inclination of the steel band bed to the horizontal is preferably about 15°. This inclination may be adjustable in order to obtain further control of the material passing through the roving maker. The adjustable driving roll 21 for the apron 12 is located slightly beyond the center of the steel band table as measured between the position of the vibrating rods 30 and 31 and the upper tensioning members of the table, the roll 21 being positioned nearer to the vibrating rods than to the upper ends of the bands. The rovings are taken from the steel bands adjacent the roller 21 by means of pairs of conveyor belts 42 and 44, there being one pair of conveyor belts for each roving, or for each space between the bands 22.

These pairs of conveyor belts 42—44 at their outer ends alternate in upper and lower positions for conveying the roving to the condenser D, which is constructed in the usual manner with upper and lower banks. This condenser is a standard machine in the textile art known as the "Barker Rubb" condenser. If the condensing action of one unit of condenser is not sufficient for the purpose desired, the rovings may be conducted through one or more additional similar condensers, in order to secure the degree of compactness to the roving which the operator may desire. The pairs of conveyor belts 42 and 44 are supported by rolls 45, 46, 47, 48, 49, 50, 51, 52, 54, and 55. Preferably, all of these rolls are driven in order that the belts may travel at the proper speed. The travel of the belts is in accordance with the arrows illustrated in Fig. 1—b. The roving is carried between the pairs of belts, both of which travel at substantially the same speed in order to carry the roving forward with the least amount of disturbance. Preferably, each pair of conveyor belts 42, 44 is separated from the adjacent pairs of conveyor belts by means of separation discs 56, 57, 58, 59 and 60. These separation discs perform two functions, first, of maintaining the conveyor belts 42 and 44 in their proper positions and secondly of preventing any slight portion of fur from overlapping between adjacent conveyor belts. These separation discs may be suitably mounted upon shafts in such manner as to revolve freely. In case of the movement of the belts not being sufficient to properly revolve these discs, the shafts carrying the discs may be rotated.

In carrying out this method by the preferred mechanism, the fur or other material is fed into the weighing machine A which feeds predetermined amounts of materials per given period of time to the lap forming machine B. The last stage of the lap forming machine B being adjustable as to speed of the conveyor belt 12 and the screen 14, the operator may cause either a thin or a thick lap to issue from this machine. While it is possible to satisfactorily feed the lap from the lap forming machine B to the roving maker C above the band table, preferably, the feed is from beneath the band table. The rolls 19 and 20 are adjustable vertically relative to the conveyor 12 in order to change the angle at which the lap approaches the band table and also to determine the space between the upper run of the belt 12 and the underneath edges of the bands 22. The space between the bands 22 and the upper run of the conveyor apron 12 preferably is wedge shaped between the rollers 21 and 20 with the base of the wedge adjacent the roller 20. As the lap is brought into the influence of the vibrating bands as it is carried over the roller 20, the vibrations of the bands, providing they are set in accordance with the diagrammatic tensioning scheme illustrated in Fig. 12, tends to pick up the lap from the conveyor belt and to separate it into longitudinally extending bodies which lie between adjacent vibrating bands. The position of the roller 21 relative to the maximum oscillation or vibration of the bands (which normally occurs adjacent the mid portion of the free vibrating part of the bands) is of some importance, in that there is a tendency of the material to move downwardly toward the zone of maximum vibration, and beyond this point there is a slight retarding action to the downward movement of the material. The further the roller 21 is positioned beyond this maximum zone, the more retarding action occurs. The amount of the retarding action is related to the degree of vibration of the bands. There is also a tendency of the rovings to drop down onto the apron after the point of maximum vibration is past. The apron 12 running over the roller 21 establishes the point where the rovings may be removed from the roving maker and be carried to the condenser. To this end, rollers 45 and 49 carrying the pairs of conveyor belts 42 and 44 are placed closely adjacent to the roller 21 so that the roving leaving the belt 12 as it passes over roller 21 is immediately picked up by the conveyor belts 42 and 44 which carry the roving to the condenser.

The material comes into the vibrating band table from the belt 12 in substantially a flat loose lap of material—the fibers extending in different directions as a miscellaneous mass of fibrous material. As soon as the material enters the vibrating band table, it is divided into longitudinal strips corresponding to the spaces between the vibrating bands. The vibrating bands strike portions of the material as a mechanical action and the vibration of the bands creates air currents. With the bands tuned as indicated diagrammatically in Figs. 11 and 12, these air currents apparently tend to rotate or swirl somewhat with the axis of rotation of the air currents extending longitudinally of the band table. The result of the mechanical action of the bands and of the rotating air currents on the loose material is to tend to orient individual fur fibers or other short fibers so that the majority of these fibers extend longitudinally of the mass of material between the vibrating bands. This orientation of the fibers may be also brought about by the movement of the fiber mass lengthwise of the bands while the fibers are suspended in a more or less free state, and such movement tends to draw the fibers into a position substantially parallel to the direction of movement.

In performing the methods by the mechanisms specified, the various factors operating upon the fibers are extremely complex and the foregoing theory is offered as an explanation of the result obtained, which is that as the rovings leave the sliver maker machine, the loose mass of material which entered into the sliver maker has been compacted into masses known in the art as rovings or slivers. These rovings are carried from the roving making machine C to the condenser D where the usual condensing action is applied to the rovings and as the rovings leave the condenser, they are sufficiently compacted to be wound on spools 62 or otherwise packaged as an article of manufacture for use in the textile art to which such rovings are adapted.

When fur slivers have been heretofore made by carding, the fibers are broken and stretched or in other words, seriously damaged because of the action of the card wires in tearing through the mass. In accordance with the present invention the fibers are not torn or broken so that the fibers retain their natural length and condition. Such fibers are referred to in the claims as "full length" fibers.

The present method is useful in handling various kinds of fur including muskrat, beaver, nutria, cat, fox, racoon, badger, seal, and the fur of other fur bearing animals and may also be used to make slivers of asbestos, chicken down, duck down, or other types of down but is particularly adapted for making slivers of rabbit fur or down. It is also capable of making rovings from artificial and manufactured fibers. In connection with the use of the words "rabbit fur" it is to be understood that it includes rabbit hair referred to in the art as "spikes," or hare's fur or hair or blends of these materials sometimes referred to in the art as "rabbit fur" or "rabbit hair." Since the present method includes making slivers or rovings of various materials, it is also to be understood as including blends or mixtures of such materials.

Rabbit fur is particularly difficult to make into a sliver or to a roving in that the major portion of this material is usually short in length and may comprise from 50% to 100% of fur fibers less than one and one-quarter inches in length. The present invention, therefore, produces a product which is a novel product in the art, namely, a sliver or roving of fur or the like in which the major portions of the fibers are shorter than one and one quarter inches in length. The product of the present method is a sliver or roving in which the individual fibers are undamaged and are substantially in the same condition as when fed to the sliver forming mechanism. The operation of the mechanism is to cause the fibers to be arranged substantially parallel to the length or axis of the roving or sliver with none of the shorter fibers being removed during the sliver forming operation, in other words, there is substantially no waste. The method may also be carried out to cause a slight helical arrangement to the major portion of the fibers with the center of the helix parallel to the axis of the sliver or roving or to cause only the fibers on the outside of the sliver or roving to be arranged in a helix with the fibers in the center of the roving extending substantially in a straight line parallel to the axis of the sliver or roving. The helical arrangement of the outer fibers is very slight so that the pitch of the helix is relatively coarse.

It is to be understood that the methods and the products as herein disclosed may be carried out in many different ways and by many different types of mechanisms. The mechanism herewith disclosed is the same as that disclosed and claimed in my application for Patent S. No. 340,050, filed June 12, 1940, of which this is a division.

What I claim is:

1. The method of forming slivers comprising separating a lap of fur fibers into a plurality of longitudinally extending masses of loose fur fibers, moving the longitudinally extending masses lengthwise, and simultaneously subjecting the masses to vibration and rotating forces acting transversely of the longitudinal axis of said masses.

2. The method of forming slivers which comprises separating a lap of fur fibers into a plurality of longitudinally extending masses of loose fur fibers of substantially uniform thickness, moving the masses lengthwise, simultaneously subjecting the masses to vibration transversely of the said masses to orient the fibers and compact the same into a longitudinal mass, and to a rolling action to further compact the fibers to produce a sliver.

3. The method of forming slivers comprising separating a heterogeneous mass of textile fibers into longitudinally extending masses, moving said masses lengthwise, and simultaneously subjecting said masses to compacting vibratory forces and to rolling forces tending to cause the fibers of said masses to be oriented so that the majority of said fibers extend in the direction of the length of said masses.

4. The method of forming slivers which comprises separating a heterogeneous mass of textile fibers into longitudinally extending separate masses, moving said masses lengthwise, and subjecting said masses while floating in air without any underneath support to beating forces and to rotating air currents tending to straighten the fibers and to cause the fibers of said masses to be oriented so that the majority of said fibers extend in the direction of the length of said masses.

5. The method of forming slivers, which method comprises separating a heterogeneously arranged mass of textile fibers into a plurality of longitudinally extending masses, moving the masses lengthwise, and subjecting the masses to rotating air forces and to compacting forces while the masses are floating in air without any underneath support.

6. The method of forming slivers, which method comprises separating a heterogeneous mass of loose textile fibers into a plurality of longitudinally extending masses, causing the masses to move lengthwise, and subjecting the moving masses to rotating air currents and to compacting forces while the masses are floating in air without any underneath support to orient the fibers longitudinally of the masses and to cause the fibers of the masses to cohere as a sliver.

7. The method of forming slivers comprising feeding a heterogeneous mass of textile fibers, dividing the masses of fibers as fed into a plurality of separate masses of longitudinally extending fibers moving lengthwise, subjecting the moving fibers while floating in air to forces delivered at substantially right angles to the direction of movement and to rotating air currents to orient the fibers and compact the masses.

8. The method of forming slivers which comprises feeding a heterogeneous mass of textile fibers, dividing the mass of fibers as fed into a plurality of separate masses of longitudinally extending loose fibers moving lengthwise, subjecting the moving fibers while floating in air to twisting air forces tending to slightly twist the fibers and to orient the fibers and compact the masses.

9. The method of making slivers comprising moving a mass of loose textile fur fibers in a longitudinal direction to comprise an elongated moving mass of said fibers of substantially uniform thickness, and subjecting said elongated mass while floating in air to rotating air forces to orient the fibers and compact the same into a sliver.

10. The method of making slivers which comprises moving a mass of loose textile fur fibers in a longitudinal direction to comprise an elongated moving mass of said fibers of substantially uniform thickness, substantially floating said elongated mass in air without any underneath support, and subjecting said elongated mass to rotating air forces to orient the fibers and compact the same into a sliver.

11. The method of making slivers which comprises dividing a mass of textile fibers into elongated masses and compacting the masses into slivers by impact blows and at the same time orienting the major portion of the fibers by rolling the masses on the axis of the sliver.

12. The method of making slivers which comprises dividing a mass of textile fibers into elongated masses, applying compacting impact forces to roll said elongated masses on their longitudinal axes while said elongated masses are substantially floating in air without any underneath support.

13. The method of making slivers which comprises dividing a loose mass of textile fibers into elongated masses by directing freely moving fibers into definite paths and floating said fibers in air, applying impact blows to the elongated masses to compact the elongated masses into slivers, and subjecting said slivers to rotating air currents after said fibers have been directed into said paths, and causing said fibers while floating in air to be rotated on their respective longitudinal axes.

LOUIS P. MILLER.